United States Patent [19]
Brug et al.

[11] 3,856,507
[45] Dec. 24, 1974

[54] RECOVERY OF GOLD FROM SOLUTION IN AQUA REGIA

[75] Inventors: James E. Brug; Eric X. Heidelberg, both of Toledo, Ohio

[73] Assignee: Owens-Illinois, Inc., Toledo, Ohio

[22] Filed: Mar. 12, 1973

[21] Appl. No.: 340,166

[52] U.S. Cl. .................. 75/.5 A, 75/108, 75/118
[51] Int. Cl. ............................................. C22b 11/04
[58] Field of Search ....... 75/118, 108, .5 A; 423/42, 423/43

[56] References Cited
UNITED STATES PATENTS

| | | | |
|---|---|---|---|
| 3,390,981 | 7/1968 | Hoffman | 75/118 |
| 3,539,114 | 11/1970 | Short | 241/16 |
| 3,565,608 | 2/1971 | Anspon et al. | 75/118 |
| 3,768,994 | 10/1973 | Daiga | 75/118 |
| 3,771,996 | 11/1973 | Short | 75/118 |

FOREIGN PATENTS OR APPLICATIONS

| | | | |
|---|---|---|---|
| 432,881 | 7/1935 | Great Britain | 75/118 |

OTHER PUBLICATIONS

Cotton et al., "Advanced Inorganic Chemistry," 2nd Edition, Interscience Publishers, N.Y. N.Y. 1967, pp. 350, 1049.

Primary Examiner—Oscar R. Vertiz
Assistant Examiner—Brian E. Hearn
Attorney, Agent, or Firm—Howard G. Bruss, Jr.; E. J. Holler

[57] ABSTRACT

Disclosed is a method for recovering gold from solution in aqua regia by adjusting the pH of the aqua regia solution to in the range of about 2 to 4 and then adding reducing agent thereto to precipitate metallic gold from solution.

10 Claims, No Drawings

RECOVERY OF GOLD FROM SOLUTION IN AQUA REGIA

This invention relates to the recovery of metallic gold from solutions of gold in aqua regia. High purity and quality gold is conventionally precipitated as metallic gold by the reduction of aqua regia solutions containing gold chloride. These gold solutions, which are theorized to contain $AuCl_3$ or $AuCl_3 \cdot HCl$ as the soluble ionic species, are prepared by dissolving pure or impure gold in aqua regia (i.e., a mixture of nitric acid and hydrochloric acid). The soluble ionic species of gold are reduced and precipitated as metallic gold by the addition of a reducing agent to the aqua regia solution.

In order for the reduction reaction to proceed, it has been the practice in the past to first remove the nitric acid from the aqua regia. This is necessary because the nitric acid is a strong oxidizing agent and will inhibit the reduction and precipitation of metallic gold upon addition of the reducing agent. In the past, the nitric acid has been removed from solutions of gold in aqua regia by a destructive distillation process wherein the nitric acid is decomposed.

As an alternative approach to destructive distillation, the oxidizing power of the nitric acid has been overcome in the past by using an excess of reducing agent. This technique uses reducing agent in an amount sufficient to reduce most or all of the oxidizing power of the nitric acid before the gold will precipitate from the aqua regia solution.

In that the oxidizing power of nitric acid is a function of the $HNO_3$ concentration and dilute solutions are not particularly oxidizing in nature, the mere dilution of aqua regia solutions of gold with water has been observed to facilitate the reduction and precipitation of metallic gold. This is apparently the approach taken in Example 1 in U.S. Pat. No. 3,539,114 although it is noted that this example also includes an excess of reducing agent. The equipment and procedures required for working with such dilute solutions do not lend themselves to the commercial adaptations.

Accordingly, it is a primary object of the present invention to provide a simple, efficient and economical method for recovering metallic gold from solution in aqua regia.

In attaining the objects of this invention, one feature resides in adding base to a solution of gold in aqua regia in an amount sufficient to raise the pH of the resulting reaction mixture to in the range of about 2 to about 4, and preferably in the range of about 2 to about 3, while maintaining the temperature of the reaction mixture below about 50°C., and preferably in the range of about 20°C. to about 40°C., and then adding reducing agent to the reaction mixture in an amount sufficient to precipitate metallic gold from the reaction mixture. The metallic gold can then be recovered from the reaction mixture by filtration or decantation.

It has been found that this technique obviates the necessity for removal of the nitric acid from aqua regia solution of gold by destructive distillation. In the pH range of about 2 to about 4, the effective oxidizing power of the nitric acid is decreased to the point where reduction and precipitation of metallic gold is no longer inhibited.

Initially, the aqua regia has a pH so low that it is zero for all practical purposes. The raising of the pH of the aqua regia solutions of gold between about 2 and about 4 with base is critical to the present metallic gold recovery process. When the pH is below about 2, the nitric acid still has sufficient oxidizing power to inhibit reduction and precipitation of metallic gold upon the addition of a reducing agent. On the other hand, when the pH of the aqua regia solution of gold is raised above about 4, the prevailing chemical equilibrium favors the formation of gold oxides and hydroxides which are not of interest here.

Any conventional and well-known gold-bearing material can be processed according to this invention. Such materials include gold-bearing natural materials, pure gold in its many forms, and reclaimed gold such as gold chips or pieces of used microelectronic circuitry. Preferred for the purposes of this invention and because it is usually required that the gold powder so formed be of extremely high purity for use in a microelectronic circuit, are the many forms of substantially pure gold as well as reclaimed gold from microelectronic circuits which can contain small portions of glass bonded thereto. Examples of commercially available, substantially pure gold in its refined form, include sponge gold, gold bars, gold granules, gold pellets, and previously prepared gold powder of low bulk density and relatively high particle size.

In practicing the present invention, practically any base can be employed to adjust the pH, although bases such as the alkali, and alkaline earth hydroxides, and carbonates are usually employed for efficiency and economy. These bases can be employed in solid form or as a concentrated aqueous solution. These bases include sodium hydroxide, potassium hydroxide, lithium hydroxide, sodium carbonate, potassium carbonate, calcium hydroxide, magnesium hydroxide, and so on. Solid sodium carbonate and concentrated aqueous solution (e.g., 25 to 60% by weight) of sodium hydroxide and potassium hydroxide are commercially expedient to minimize the volume of water that must be handled in the process. The term "base" is used herein in its conventional sense, and refers to material which yield hydroxyl ions in aqueous solution.

The term reducing agent is used herein according to its conventional meaning and refers to materials which are readily oxidized by reducing nitric acid. Practically any reducing agent such as sulfites, (e.g., sodium sulfite, and sodium acid sulfite), hydrazine, stannous chloride, sulfur dioxide, hydroquinone, sugar, sulfurous acid, formaldehyde, metal dust such as zinc or aluminum dust, ferrous sulfate, hydrazine sulfate, or hypophosphoric acid can be used to reduce and precipitate metallic gold from the aqua regia solution having the pH adjusted to in the range of about 2 to 4. Concentrated aqueous solutions of sodium sulfite are preferred for efficiency and economy.

The amount of reducing agent actually employed will vary depending upon the various parameters of the system. Generally speaking, it is desirable to reduce and precipitate as much gold from the aqua regia solution as possible. Therefore, the reducing agent is usually added in amounts slightly in excess of the stoichiometric amount necessary to precipitate substantially 100% of the gold from the aqua regia solution.

"Aqua regia" is used herein to include mixtures of nitric acid and hydrochloric acid having the capacity to dissolve gold. Aqua regia solutions are usually formed by mixing about 2 to 3 volumes of concentrated hydrochloric acid (36 weight % HCl in water) with 1 volume of concentrated nitric acid (70 weight % of $HNO_3$ in water).

The aqua regia can also contain dissolved or suspended materials in addition to the gold depending on the gold recovery process being employed. The presence of such suspended materials has not been found to substantially affect the practice of the present invention. Aqua regia containing the equivalent of about 1 to 180 grams of gold per liter of aqua regia solution have been encountered in commercial situations.

When it is desired to precipitate the gold as a fine metal powder rather than as a gold film or gold flake, the principles of commonly assigned copending application S.N. 124,558 filed March 15, 1971, now U.S. Pat. No. 3,768,994, the disclosure of which is incorporated by reference can be employed.

According to application Ser. No. 124,558, now U.S. Pat. No. 3,768,994, a particle size inhibitor or emulsifying agent such as butyl stearate is mixed with the aqua regia solution containing dissolved gold to apparently envelop and coat gold particles to prevent coalescence during the subsequent reduction and precipitation of gold powder.

Emulsifying agents that can be used for this purpose include the organic compounds known as lubricants, dispersants, and emulsifiers. The preferred emulisfying agent is an ester of fatty acid such as an alkyl stearate with the best results being obtained with a butyl stearate. The alkyl esters of fatty acids are those in which the alkyl group is about 1 to 8 carbon atoms and preferably about 3 to 5 carbon atoms and a fatty acid generally represented by the formula $C_nH_{2n+1}COOH$ in which n is generally greater than 10 and preferably greater than 17 up to about 24. Examples of the suitable fatty acid component of the alkyl ester of fatty acid is lauric acid, palmitic acid, and stearic acid. Hence, the suitable fatty acids are those in which $n$ is 11 such as lauric acid, where $n$ is 13 such as myristic acid, where $n$ is 15 such as palmitic acid, and where $n$ is 17 such as stearic acid. Also suitable are unsaturated aliphatic acids such as oleic (having 18 carbon atoms including the carboxyl group), erucic acid (having 22 carbon atoms), linoleic acid (having 18 carbon atoms) and linolenic acid (having 18 carbon atoms).

These emulsifiers can be added at any time prior to the reduction and precipitation of the gold from the aqua regia solution. In the interest of efficiency and economy of commerical practice, the emulsifying agent is usually added after the pH has been adjusted in the range of 2 to 4 and prior to the addition of the reducing agent.

The proportion of an emulsifying agent employed in producing gold powder is in accordance with Ser. No. 124,558 and is usually within the range of about 0.01 parts by weight up to about 10 parts by weight per hundred part of gold in solution.

The examples that follow illustrate tecniques for recovering metallic gold from aqua regia solution. In these examples all parts are parts by weight, all percentages are weight percentages and all temperatures are in degrees C. unless specified otherwise. These examples employ concentrated hydrochloric acid (37% by weight HCl in water) and concentrated nitric acid (70% by weight $HNO_3$ in water).

EXAMPLE 1

PART A

One hundred grams of small gold pellets are charged to aqua regia at room temperature in a reaction vessel equipped with a stirrer and a heater. The aqua regia is formed by mixing 425.ml of concentrated hydrochloric acid and 150 ml of concentrated nitric acid. The resulting mixture is stirred and heated to about 40°C. The gold completely dissolves in the aqua regia to form a clear, golden-colored solution. The solution is cooled to room temperature.

PART B

The solution from Part A is charged to a second reaction vessel equipped with a stirrer, a pH meter, a thermometer, and a cooling jacket and stirring and cooling are initiated. The initial temperature is about 25°C. and the initial pH is essentially zero.

A concentrated sodium hydroxide solution in water (about 50% by weight NaOH) is slowly added to the stirred reaction vessel to raise the pH to in the range of about 2.5 to 3.0. The addition rate of sodium hydroxide is regulated so that the temperture of the reaction mixture does not exceed about 40°C. About 210 ml of the concentrated sodium hydroxide solution are required to raise the pH to about 2.8.

The resulting reaction mixture is dark orange in color and is quite clear.

PART C 10 ml of butyl stearate are mixed with the reaction mixture from Part B and a solution of 125 grmas sodium sulfite in 875 ml of water are added thereto while stirring and cooling is continued. The addition of the sodium sulfite solution is accomplished over a half a minute period and the temperature rises sharply to about 50°C. Gold powder rapidly precipitates from the solution.

The resulting reaction mixture is then filtered and a fine gold powder is collected as the filter cake. The gold powder is washed thoroughly with acetone and then water. The gold powder is then dried in an oven at 110°C. for several hours.

99.8 grams of a fine, high purity gold powder are obtained. The gold powder has an average particle size in the range of about 5 to 10 microns, and has a surface area of about 0.14 square meters per gram as determined by BET testing procedures. The gold powder is suitable for using in screen-printing microcircuits. When the foregoing procedures are repeated except that butyl stearate is omitted, the gold precipitates in the form of gold flakes or a gold film. This form of gold is desired for some applications.

EXAMPLE 2

This example illustrates the recovery of gold from scrap printing paste used in forming electrical microcircuits.

PART A

A scrap printing paste comprising a mixture of about 5% lead borosilicate glass frit, 80% of gold powder and 15% by weight of an organic resinous binder is ignited in a refractory dish to burn away the organic components. The resulting fired residue weighs 246.4 grams and is a solidified mass having a gold luster.

PART B

The residue from Part A is placed in a reaction vessel containing 375 ml of concentrated nitric acid and 1060 ml of concentrated hydrochloric acid. The vessel is equipped with a stirrer, and a pH meter. The residue dissolves readily to form a deep red solution which contains a sediment comprising the glass frit particles. The pH of the solution is essentially zero.

The pH of the deep red solution is adjusted upward to about 2.8 by slowly adding 500 ml of aqueous 50% sodium hydroxide solution thereto. The reaction is exothermic and requires about two and one-half hours for the sodium hydroxide addition in order to maintain the temperature of the reaction mixture below 50°C.

The resulting reaction mixture is light orange in color and is quite hazy. The sediment is filtered from the reaction mixture and the resulting filtrate is orange and clear.

PART C 25 ml of butyl stearate are mixed with the clarified filtrate from Part B and placed in a reaction vessel equipped with a stirrer and a heater. A sodium sulfite solution comprising 313 grams of sodium sulfite in 2.2 liters of water is added to the butyl stearate-filtrate mixture with rapid stirring over a 15–30 second time period. The temperature of the resulting reaction mixture rapidly rises from about 20°C. to about 45°C. while fine gold particles precipitated therefrom.

The gold particles are then filtered from the reaction mixture and thoroughly washed with acetone and water. The gold particles are dried at 110°C. in an oven. 236.7 grams of fine gold powder having an average particle size of about 5–10 microns and a surface area of about 0.14 square meters per gram (by BET) are obtained.

EXAMPLE 3

This example demonstrates the recovery of gold from an aqua regia etching solution used in etching printed microcircuits.

PART A

Aqua regia is prepared by mixing 3 volumes of concentrated hydrochloric acid with 1 volume of concentrated nitric acid. This aqua regia is then used to etch gold-printed microcircuits and as a result contains the equivalent of about 51 grams of dissolved gold per liter of aqua regia solution. The aqua regia solution is yellow-orange in color and very hazy due to the content of suspended glass and other insoluble particulates picked up during the etching operation.

14 liters of this aqua regia solution are placed in a reaction vessel equipped with a stirrer, a pH meter, and a cooling jacket.

The aqua regia solution is at room temperature and has a pH of essentially zero. 3.5 liters of a 50% aqueous solution of sodium hydroxide are slowly added with stirring and cooling over a 2-hour period to raise the pH to about 2.5 to 3.0 while the temperature is maintained at less than about 40°C. The reaction mixture is cooled to room temperature and filtered to remove insolubles. The filtrate is clear and yellow-gold in color.

PART B

The inside of a reaction vessel equipped with a pH meter, stirrer, and cooling jacket is wiped with a cloth saturated with butyl stearate and 250 ml of butyl stearate are added thereto. The filtrate from Part A is then added to the vessel and stirring and cooling are initiated.

A solution of 875 grams of sodium sulfite in 7.6 liters of water is then added to the butyl stearate-aqua regia mixture over a 30-second period. Gold is precipitated from the solution as fine particles. The reaction mixture is filtered and gold particles collect as the filter cake. The cake is washed with isopropanol and then water. The filter cake is then dried in an oven. A fine gold powder results.

Similar results can be obtained using an equivalent amount of solid sodium carbonate in place of the sodium hydroxide in the above procedures.

Similar results are also obtained when oleic acid is used in place of the butyl stearate in the above procedures.

Having thus described the invention, what is claimed is:

1. In the process for recovering gold from solution in aqua regia, the improvement comprising the steps of:
   adding base to said aqua regia in an amount sufficient to raise the pH of the resulting reaction mixture to in the range to about 2 to about 4 without precipitating gold from solution while maintaining the temperature of said reaction mixture below about 50°C. and;
   adding reducing agent to said reaction mixture in an amount sufficient to precipitate metallic gold from said reaction mixture; and
   recovering said metallic gold from said reaction mixture.

2. The process of claim 1 wherein said pH is raised to in the range of about 2 to about 3.

3. The process of claim 1 wherein the temperature of said reaction mixture is maintained in the range of about 20° to 40°C. during the addition of said base.

4. The process of claim 1 wherein an emulsifying agent capable of coating freshly formed gold particles and preventing coalescence thereof is mixed with the aqua regia solution of gold prior to adding the reducing agent thereto in an amount sufficient to precipitate said metallic gold as a fine powder.

5. The process of claim 4 wherein said emulsifying agent is mixed with said aqua regia solution after the addition of said base.

6. The process of claim 4 wherein said emulsifying agent is butyl stearate.

7. The process of claim 1 wherein said base is an aqueous solution of an alkali metal hydroxide.

8. The process of claim 7 wherein said base is sodium hydroxide.

9. The process of claim 1 wherein said reducing agent is sodium bisulfite.

10. The process of claim 1 wherein the aqua regia solution of gold is formed by the aqua regia etching of electrical microcircuit structures having gold circuitry thereon.

* * * * *